United States Patent
Zhang et al.

(10) Patent No.: US 12,452,885 B2
(45) Date of Patent: Oct. 21, 2025

(54) METHOD PERFORMED BY USER EQUIPMENT, AND USER EQUIPMENT

(71) Applicant: Sharp Kabushiki Kaisha, Sakai (JP)

(72) Inventors: Chongming Zhang, Shanghai (CN); Renmao Liu, Shanghai (CN); Shohei Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 376 days.

(21) Appl. No.: 18/016,906

(22) PCT Filed: Jul. 13, 2021

(86) PCT No.: PCT/CN2021/105979
§ 371 (c)(1),
(2) Date: Jan. 19, 2023

(87) PCT Pub. No.: WO2022/017222
PCT Pub. Date: Jan. 27, 2022

(65) Prior Publication Data
US 2023/0292343 A1    Sep. 14, 2023

(30) Foreign Application Priority Data

Jul. 24, 2020 (CN) .......................... 202010727691.0

(51) Int. Cl.
*H04W 72/25* (2023.01)
*H04L 1/1812* (2023.01)

(52) U.S. Cl.
CPC .......... *H04W 72/25* (2023.01); *H04L 1/1812* (2013.01)

(58) Field of Classification Search
CPC ... H04W 28/04; H04W 72/04; H04W 72/042; H04W 88/08; H04L 5/0007; H04L 1/1812
(Continued)

(56) References Cited

U.S. PATENT DOCUMENTS 11,627,591 B2 * 4/2023 Park ...................... H04L 1/1812
370/329
11,632,220 B2 * 4/2023 Park ...................... H04W 76/28
370/329
(Continued)

FOREIGN PATENT DOCUMENTS

| CN | 111132381 A | * | 5/2020 | ............ H04W 76/38 |
| KR | 110692279 A | * | 1/2020 | ............ H04W 88/04 |
| WO | WO 2011/002764 A2 | * | 1/2011 | ............. B65G 37/00 |

OTHER PUBLICATIONS

3GPP TSG-RAN WG2 #110-e, Online, Jun. 1-12, 2020, R2-2005720, Agenda item: 6.4.3.1, Source: LG Electronics Inc. Title: Report of [Post109bis-e][957][V2X]: MAC issues (LG). (Year: 2020).*

(Continued)

*Primary Examiner* — Asad M Nawaz
*Assistant Examiner* — Sanjay K Dewan
(74) *Attorney, Agent, or Firm* — Keating & Bennett, LLP

(57) ABSTRACT

Provided in the present invention are a method performed by user equipment, and user equipment. The method performed by user equipment (UE) includes: when a periodically started timer T-active is running, the UE monitoring a physical sidelink control channel (PSCCH) and receiving sidelink control information (SCI); if the received SCI information indicates that HARQ feedback is to be performed, starting a timer T1-retx; if the received SCI information indicates that HARQ feedback is not to be performed, starting a timer T2-retx; and when the timer T1-retx and the timer T2-retx are running, the UE monitoring the PSCCH.

2 Claims, 2 Drawing Sheets

(58) Field of Classification Search
USPC ............................................................ 370/329
See application file for complete search history.

(56) References Cited

U.S. PATENT DOCUMENTS

| | | | | |
|---|---|---|---|---|
| 11,647,540 | B2* | 5/2023 | Lee | H04W 74/0808 370/329 |
| 11,700,086 | B2* | 7/2023 | Park | H04L 1/1819 370/329 |
| 11,736,261 | B2* | 8/2023 | Xue | H04W 72/0446 370/329 |
| 2023/0104267 | A1* | 4/2023 | Shrivastava | H04L 1/1822 370/329 |
| 2023/0269034 | A1* | 8/2023 | Karaki | H04L 1/1825 370/329 |
| 2023/0318757 | A1* | 10/2023 | Lee | H04L 1/1896 370/329 |

OTHER PUBLICATIONS

3GPP TSG-RAN WG2 Meeting #110-e, Online, Jun. 1-12, 2020, R2-2005970, Change Request, 38.321, Current version 16.0.0, Title Corrections to 5G V2X with NR Sidelink, Source to WG: LG Electronics, Work Item code: %G_V2X_NRSL, Rel. 16. (Year: 2020).*

3GPP TSG-RAN WG2 Meeting #110 electronic Jun. 1-12, 2020, R2-2005492, Agenda Item: 6.4.3.1, Source: Huawei, HiSilicon, Title: Discussion on remaining MAC open issues for 5G V2X with NR SL. (Year: 2020).*

3GPP TSG RAN WG1 Meeting #96bis, Xi'an, China, Apr. 8-12, 2019, R1-1903943, Agenda Item: 7.2.4.1.1, Source: Huawei, HiSilicon, Title: Sidelink physical layer structure for NR V2X. (Year: 2019).*

RAN2, "RAN2 CRs to 5G V2X with NR sidelink", 3GPP TSG-RAN Meeting #88, RP-201176, Jun. 29-Jul. 3, 2020, 2 pages.

LG Electronics Inc., "Corrections to 5G V2X with NR Sidelink", 3GPP TSG-RAN WG2 Meeting #110-e, R2-2005970, Jun. 1-12, 2020, 45 pages.

Huawei et al., "Discussion on remaining MAC open issues for 5G V2X with NR SL", 3GPP TSG-RAN WG2 Meeting #110 electronic, R2-2005492, Jun. 1-12, 2020, 44 pages.

LG Electronics Inc., "Report of [Post109bis-e][957][V2X]: MAC Issues (LG)", 3GPP TSG-RAN WG2 Meeting #110-e, R2-2005720, Jun. 1-12, 2020, 97 pages.

* cited by examiner

METHOD PERFORMED BY USER EQUIPMENT, AND USER EQUIPMENT

TECHNICAL FIELD

The present invention relates to the technical field of wireless communications. More specifically, the present invention relates to a method performed by user equipment, and corresponding user equipment.

BACKGROUND

Vehicle to Everything (V2X) is a new generation of information and communication technology that connects vehicles with everything, in which V stands for vehicle, and X stands for any object that exchanges information with the vehicle, and X currently mainly includes vehicles, persons, traffic roadside infrastructure, and networks.

For a pair of UEs performing V2X service communication, classification may be performed according to transmission and reception so as to divide the same into transmitting UE (TX UE) and receiving UE (RX UE). Since the transmitting UE does not always transmit information, in order to enable the receiving UE to conserve power, the receiving UE may be configured to be in a discontinuous reception mode (DRX). That is, the receiving UE performs PSCCH monitoring only at an agreed occasion. Therefore, how to define and maintain such a valid monitoring occasion at the RX UE side is a problem to be solved.

Further, to ensure that the RX UE can perform reception correctly, transmission performed by the TX UE is also restricted. That is, the TX UE can only perform transmission to the RX UE at an agreed occasion, including transmitting a PSCCH targeted at the RX UE, a corresponding PSSCH, etc. Therefore, how to define and maintain such an occasion at the TX UE side is also a problem to be solved.

In a particular transmission mode, resources used by the TX UE to transmit the PSCCH and the PSSCH are all scheduled by a base station. In consideration of the discontinuous reception of the RX UE, the TX UE needs to negotiate with the base station to ensure that resources of the base station are also within a valid monitoring occasion of the RX UE. Therefore, how to negotiate such information is also a problem to be solved.

SUMMARY

In view of the above problems in the prior art, an objective of the present invention is to provide a method performed by user equipment and user equipment, which can define and maintain a valid monitoring occasion at an RX UE side, can define and maintain, at a TX UE side, an occasion for transmitting a PSCCH targeted at the RX UE, a corresponding PSSCH, etc., and can achieve effective negotiation with a base station so as to ensure that resources of the base station are also within the valid monitoring occasion of the RX UE.

According to a first aspect of the present disclosure, provided is a method performed by user equipment (UE), comprising: when a periodically started timer T-active is running, the UE monitoring a physical sidelink control channel (PSCCH) and receiving sidelink control information (SCI); if the received SCI information indicates that HARQ feedback is to be performed, starting a timer T1-retx; if the received SCI information indicates that HARQ feedback is not to be performed, starting a timer T2-retx; and when the timer T1-retx and the timer T2-retx are running, the UE monitoring the PSCCH.

In the method performed by user equipment according to the first aspect, the UE may start the timer T1-retx at the end of a physical sidelink feedback channel (PSFCH) transmission, and the UE may start the timer T2-retx at the end or start of a corresponding physical sidelink shared channel (PSSCH) transmission.

In the method performed by user equipment according to the first aspect, a timer T1-rtt and a timer T2-rtt may be further provided; if the SCI information indicates that HARQ feedback is to be performed, the timer T1-rtt is started, and the timer T1-retx is started after expiry of the timer T1-rtt; and if the SCI information indicates that HARQ feedback is not to be performed, the timer T2-rtt is started, and the timer T2-retx is started after expiry of the timer T2-rtt.

In the method performed by user equipment according to the first aspect, the UE may start the timer T1-rtt at the end of a physical sidelink feedback channel (PSFCH) transmission; and the UE may start the timer T2-rtt at the end or start of a corresponding physical sidelink shared channel (PSSCH) transmission.

In the method performed by user equipment according to the first aspect, if the SCI received by the UE is valid, a timer T-inactive may be started, and when the timer T-inactive is running, the UE monitors the PSCCH.

According to a second aspect of the present disclosure, provided is a method performed by user equipment (UE), comprising: when a periodically started timer T-active is running, the UE transmitting a physical sidelink control channel (PSCCH) and transmitting sidelink control information (SCI); if the transmitted SCI information indicates that HARQ feedback is to be performed, starting a timer T1-retx; if the transmitted SCI information indicates that HARQ feedback is not to be performed, starting a timer T2-retx; and when the timer T1-retx and the timer T2-retx are running, the UE transmitting the PSCCH and a physical sidelink shared channel (PSSCH), and receiving a physical sidelink feedback channel (PSFCH).

In the method performed by user equipment according to the second aspect, the UE may start the timer T1-retx at the end of the PSFCH transmission; and the UE may start the timer T2-retx at the end or start of a corresponding PSSCH transmission.

In the method performed by user equipment according to the second aspect, a timer T1-rtt and a timer T2-rtt may be further provided; if the SCI information indicates that HARQ feedback is to be performed, the timer T1-rtt is started, and the timer T1-retx is started after expiry of the timer T1-rtt; and if the SCI information indicates that HARQ feedback is not to be performed, the timer T2-rtt is started, and the timer T2-retx is started after expiry of the timer T2-rtt.

In the method performed by user equipment according to the second aspect, the UE may start the timer T1-rtt at the end of a PSFCH transmission, the UE may start the timer T2-rtt at the end or start of a corresponding PSSCH transmission, and in addition, when the UE transmits the SCI, a timer T-inactive may be started, and when the timer T-inactive is running, the UE transmits the PSCCH and the PSSCH, and receives the PSFCH.

According to a third aspect of the present disclosure, provided is user equipment, comprising: a processor; and a memory storing instructions, wherein the instructions, when run by the processor, perform the method performed by user equipment described herein.

BRIEF DESCRIPTION OF THE DRAWINGS

In the drawings, identical or similar structures are marked by identical or similar reference numerals.

DETAILED DESCRIPTION

Figure 1:
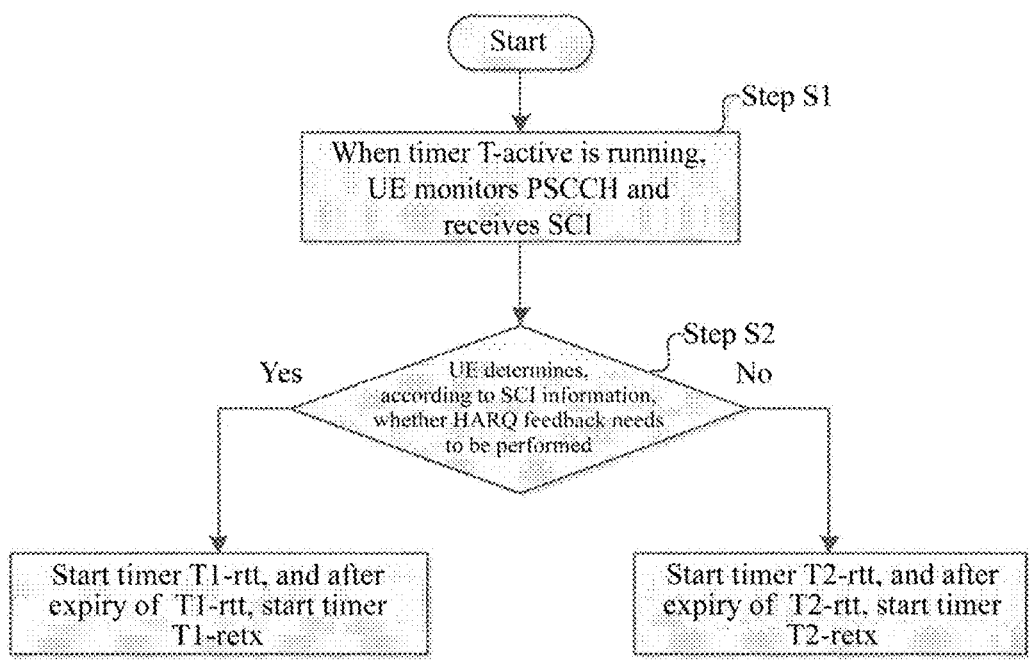
FIG. 1 is a schematic flowchart showing the processing processes of Embodiment 1 in the present disclosure.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment
NR: New Radio
Sidelink
V2X: Vehicle to Everything
MAC: Medium Access Control
MAC CE: MAC Control Element
LCID: Logical Channel Identity
PDU: Protocol Data Unit
SDU: Service Data Unit
PSSCH: Physical Sidelink Shared Channel
PSFCH: Physical Sidelink Feedback Channel
SCI: Sidelink Control Information
PSCCH: Physical Sidelink Control Channel
RRC: Radio Resource Control
HARQ: Hybrid Automatic Repeat Request The terms "associated", "corresponding", and "corresponding to" herein may be replaced with each other.

The two terms sidelink and V2X sidelink herein may interchangeable.

There is least one pair of UEs herein: the TX UE and the RX UE. There may also be a group of UEs herein, where one UE is the TX UE, and the other UEs are RX UEs.

Harq Acknowledge Information

In sidelink communication, one SCI is used to indicate/schedule PSSCH transmission. The UE receiving the SCI may, in turn, receive the PSSCH on the basis of information provided by the SCI, and determine, according to an indication in the SCI, whether HARQ acknowledge information (HARQ-ACK) needs to be transmitted on a PSFCH channel The HARQ-ACK information may also be referred to as HARQ feedback, and is a response of the UE to PSSCH reception. The HARQ-ACK information provided by the UE may include positive acknowledge (ACK) information or negative acknowledge (NACK) information, or may include only negative acknowledge (NACK) information.

The ACK may indicate that a PSSCH or a MAC PDU carried by the PSSCH is correctly decoded/received. The NACK may indicate that no PSSCH is received or a MAC PDU on a received PSSCH is not correctly decoded/received.

Indication information may be present in the SCI to indicate whether HARQ feedback is enabled. If the indication information indicates that HARQ feedback is enabled, the UE needs to transmit HARQ-ACK information. If the indication information indicates that the HARQ feedback is disabled, the UE does not need to transmit the HARQ-ACK information.

Several embodiments of the present invention are described in detail below.

Embodiment 1

In sidelink transmission, the RX UE has two working modes according to whether HARQ-ACK information needs to be transmitted:

Mode 1: after a PSSCH is received, HARQ-ACK information further needs to be transmitted by means of a PSFCH, that is, HARQ feedback is enabled. Mode 2: after a PSSCH is received, HARQ-ACK information does not need to be transmitted, that is, HARQ feedback is disabled.

As an example, FIG. 1 is a schematic flowchart showing the processing processes of Embodiment 1 in the present disclosure.

The RX UE may maintain a valid occasion for discontinuous reception according to the above different working modes, which specifically includes:

defining a timer T-active, where the timer may be periodically started, and a starting cycle or an interval between starting times may be referred to as a DRX cycle.

As shown in FIG. 1, in step S1, a UE monitors a PSCCH when the timer T-active is running. The PSCCH monitoring may mean that the UE receives, in each PSCCH transmission duration (PSSCH duration), first stage SCI transmitted on a PSCCH, then determines a PSSCH transmission duration (PSSCH duration) according to the received first stage SCI, and receives second stage SCI and a transport block transmitted on a PSSCH. Then, the received SCI (which may include the first stage SCI and the second stage SCI) is used as valid SCI, and is associated with the received transport block. Preferably, only when address information provided in the SCI interests the UE, then can such SCI be used as valid SCI. Alternatively, only when address information provided in the SCI indicates that the UE is a reception target, then can such SCI be used as valid SCI.

In step S2, the UE determines, on the basis of the received SCI information, whether HARQ feedback needs to be performed. The specific processing may be performed, for example, as follows.

In one scenario, if the SCI indicates that HARQ feedback is enabled, or indicates that HARQ-ACK information needs to be transmitted, that is, the SCI information indicates that HARQ feedback needs to be performed, then the UE starts a timer T1-rtt at the end of a corresponding PSFCH transmission. Specifically, the timer T1-rtt may be started in the first symbol at the end of the PSFCH transmission.

After expiry of the timer T1-rtt, a timer T1-retx is started.

Optionally, when the UE receives a MAC PDU carried in the PSSCH, the timer T1-retx is stopped no matter whether decoding is performed correctly or fails if the timer T1-retx is still running In another scenario, if the SCI indicates that HARQ feedback is disabled, or indicates that HARQ-ACK information does not need to be transmitted, or does not indicate that HARQ-ACK information needs to be transmitted, then the UE starts a timer T2-rtt at the end or start of a corresponding PSSCH transmission. Preferably, if the SCI schedules multiple PSSCH transmissions, the timer T2-rtt may be started at the end (or start) of the first PSSCH transmission, or the timer T2-rtt may be started after all PSSCH transmissions are finished.

After expiry of the timer T2-rtt, a timer T2-retx is started.

Optionally, when the UE receives a MAC PDU carried in the PSSCH, the timer T2-retx is stopped no matter whether decoding is performed correctly or fails if the timer T2-retx is still running When T1-retx and T2-retx are running, the UE monitors the PSCCH. The PSCCH monitoring includes receiving the PSCCH, decoding SCI carried therein, and determining whether address information carried in the SCI is valid address information. The valid address information may mean that a destination address in the address information corresponds to the RX UE, and a source address in the address information corresponds to the TX UE.

In the above two cases, when the UE receives valid SCI, the UE starts a timer T-inactive. When the timer T-inactive is running, the UE monitors the PSCCH.

It may be considered that when the timers T-active, T-inactive, T1-retx, and T2-retx are running, the UE is in an active time or a valid occasion for discontinuous reception. In the active time, UE needs to monitor the PSCCH.

Embodiment 2

Figure 2:
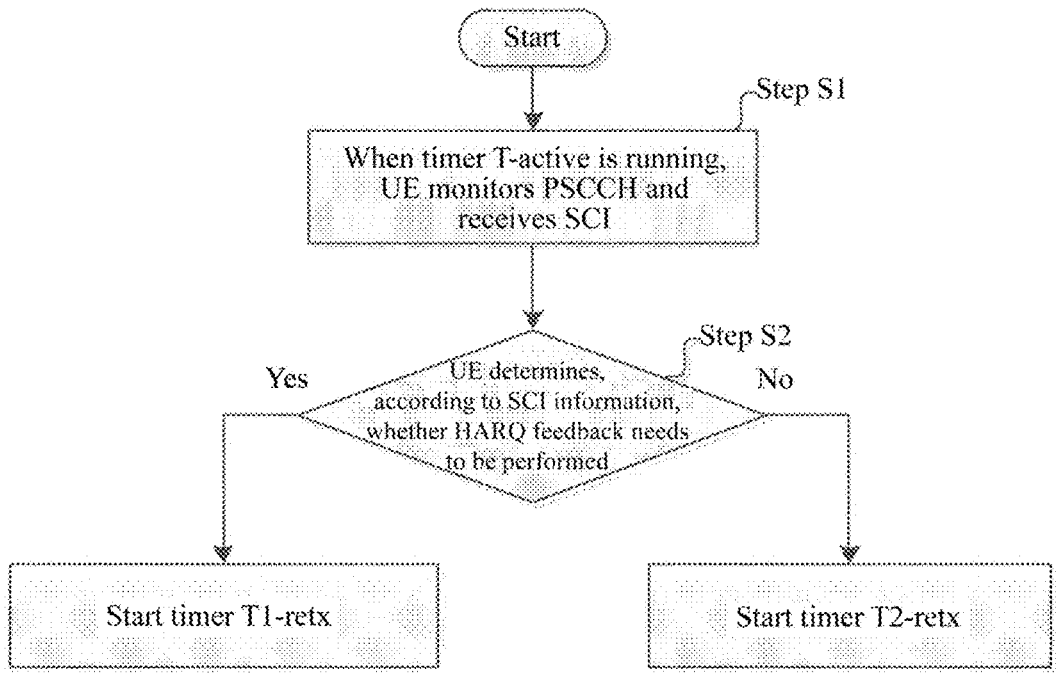
FIG. 2 is a schematic flowchart showing the processing processes of Embodiment 2 in the present disclosure.

Embodiment 2 of the present disclosure will be described in detail below. Embodiment 2 differs from Embodiment 1 in that durations of T1-rtt and T2-rtt in Embodiment 1 may be set to zero. As an example, FIG. 2 is a schematic flowchart showing the processing processes of Embodiment 2 in the present disclosure. As shown in FIG. 2, the specific processing processes in Embodiment 2 are as follows.

A timer T-active is defined, where the timer may be periodically started, and a starting cycle or an interval between two starting times may be referred to as a DRX cycle.

In step S1 of FIG. 2, UE monitors a PSCCH when the timer T-active is running

In step S2, the UE determines, on the basis of the received SCI information, whether HARQ feedback needs to be performed. The specific processing may be performed, for example, as follows.

In one scenario, if the SCI indicates that HARQ feedback is enabled, or indicates that HARQ-ACK information needs to be transmitted, that is, the SCI information indicates that HARQ feedback needs to be performed,
  then the UE starts a timer T1-retx at the end of a PSFCH transmission. Specifically, the timer T1-retx may be started in the first symbol at the end of the PSFCH transmission.

In another scenario, if the SCI indicates that HARQ feedback is disabled, or indicates that HARQ-ACK information does not need to be transmitted, or does not indicate that HARQ feedback is enabled, or does not indicate that HARQ-ACK information needs to be transmitted,
  then the UE starts a timer T2-retx at the end or start of a corresponding PSSCH transmission. Preferably, if the SCI schedules multiple PSSCH transmissions, the timer T2-retx may be started at the end (or start) of the first PSSCH transmission, or the timer T2-retx may be started after all PSSCH transmissions are finished.

Embodiment 3

Embodiment 3 of the present disclosure will be described in detail below. Embodiments 1 and 2 define the active time of the receiving UE and the various running timers for maintaining such active time. The same active time may be defined from the perspective of the transmitting UE. For one sidelink connection, or for a pair of source and destination addresses, the TX UE transmits, within a corresponding active time thereof, information/data corresponding (or belonging) to the connection or information/data corresponding (or belonging) to the pair of addresses, which may be specifically a PSCCH and a PSSCH carrying information/data, and receives, within the active time, a PSFCH corresponding to the connection or the pair of addresses.

When a timer T-active is running, the TX UE is allowed to transmit a PSCCH, and optionally may transmit a PSSCH, and receive a PSFCH.

When the TX UE transmits SCI, a timer T-inactive is started.

In one scenario, if the SCI indicates that HARQ feedback is enabled, or indicates that HARQ-ACK information needs to be transmitted, that is, the SCI indicates that HARQ feedback needs to be performed,
  then the TX UE starts a timer T1-rtt at the end of a PSFCH transmission. Specifically, the timer T1-rtt may be started in the first symbol at the end of the PSFCH transmission.

After expiry of the timer T1-rtt, a timer T1-retx is started.

In another scenario, if the SCI indicates that HARQ feedback is disabled, or indicates that HARQ-ACK information does not need to be transmitted, or does not indicate that HARQ feedback is enabled, or does not indicate that HARQ-ACK information needs to be transmitted,
  then the TX UE starts a timer T2-rtt at the end or start of a corresponding PSSCH transmission. Preferably, if the SCI schedules multiple PSSCH transmissions, the timer T2-rtt may be started at the end (or start) of the first PSSCH transmission, or the timer T2-rtt may be started after all PSSCH transmissions are finished.

After expiry of the timer T2-rtt, a timer T2-retx is started.

When the timers T-active, T-inactive, T1-retx, and T2-retx are running, the TX UE is in an active time, and can transmit a PSCCH and a PSSCH and receive a PSFCH.

In a special scenario, the timer T1-rtt and the timer T2-rtt may be set to zero. Then, another implementation of the foregoing solution may be as follows:

When the timer T-active is running, the TX UE transmits a PSCCH and optionally a PSSCH.

When the TX UE transmits SCI, the timer T-inactive is started.

In one scenario, if the SCI indicates that HARQ feedback is enabled, or indicates that HARQ-ACK information needs to be transmitted, that is, the SCI information indicates that HARQ feedback needs to be performed,
  then the TX UE starts a timer T1-retx at the end of a PSFCH transmission. Specifically, the timer T1-retx may be started in the first symbol at the end of the PSFCH transmission.

In another scenario, if the SCI indicates that HARQ feedback is disabled, or indicates that HARQ-ACK information does not need to be transmitted, or does not indicate that HARQ feedback is enabled, or does not indicate that HARQ-ACK information needs to be transmitted,
  then the TX UE starts a timer T2-retx at the end or start of a corresponding PSSCH transmission. Preferably, if the SCI schedules multiple PSSCH transmissions, the timer T2-retx may be started at the end (or start) of the first PSSCH transmission, or the T2-rtt may be started after all PSSCH transmissions are finished.

Embodiment 4

Embodiment 4 of the present disclosure will be described in detail below. In Embodiment 3, the timers having the same starting mechanisms as the timers for the RX UE side are defined for the TX UE side to maintain the active time. Different timers may also be defined for maintaining the active time at the TX UE side. An implementation may be as follows:

When a timer T-active-tx is running, the TX UE is allowed to transmit a PSCCH, and optionally may transmit a PSSCH, and receive a PSFCH.

When the TX UE transmits SCI, a timer T-inactive-tx is started.

When the timers T-active-tx and T-inactive-tx are running, the TX UE is in an active time, and can transmit a PSCCH and a PSSCH and receive a PSFCH.

Embodiment 5

For the TX UE, when a new transmission is performed, a logical channel that can be used for transmission needs to be selected. Since a logical channel is always associated with one sidelink connection or a pair of addresses, during selecting, it is necessary to consider whether the corresponding sidelink connection or addresses mentioned in Embodiments-3 above are in an active time. A specific implementation may be as follows:

when a new transmission is performed, the TX UE selects a destination address corresponding to a logical channel having the highest priority and having sidelink data that need to be transmitted. In addition, it is also necessary to determine whether an address/sidelink connection corresponding to the logical channel is configured with discontinuous reception. If the address/sidelink connection corresponding to the logical channel is configured with discontinuous reception, then it is further necessary to determine whether the current transmission occasion is within an active time in the discontinuous reception configuration. If the current transmission occasion is within the active time, then the TX UE may select the address as a transmission address. If the current transmission occasion is not within the active time, then the TX UE may not select the address as a transmission address.

Embodiment 6

When a sidelink transmission resource (a time or frequency resource) is scheduled by a base station, the TX UE needs to notify the base station of information about the active time described in Embodiments 1-3 above, or relevant information about discontinuous reception. A specific notification manner may be for the TX UE to notify, via a SidelinkUEInformationNR message, the base station/network side of an SL DRX configuration preferred by the UE.

When the UE is in a connected state, and an upper layer has indicated a DRX configuration requirement or a power conservation requirement to the UE, and if the UE is not configured with SL DRX in a current primary cell (PCell), then the UE may trigger a SidelinkUEInformationNR message transmission procedure. In this procedure, the UE transmits the SidelinkUEInformationNR message to the base station/network side. In this message, the UE indicates a preferred SL DRX configuration, e.g., a duration of a relevant timer in the aforementioned embodiments and a length of a DRX cycle. This scenario may occur when the UE has undergone a handover and the Pcell has been changed.

Embodiment 7

Figure 3:
FIG. 3 is a block diagram showing user equipment (UE) according to the present disclosure.

In Embodiment 7, the user equipment according to the present disclosure is described briefly. FIG. 3 is a schematic structural block diagram of user equipment (UE) according to the present invention. As shown in FIG. 3, the user equipment (UE) 30 includes a processor 301 and a memory 302. The processor 301 may include, for example, a microprocessor, a microcontroller, an embedded processor, and the like. The memory 302 may include, for example, a volatile memory (such as a random access memory (RAM)), a hard disk drive (HDD), a non-volatile memory (such as a flash memory), or other memories. The memory 302 stores program instructions. The instructions, when run by the processor 301, can perform the above method performed by user equipment as described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A user equipment, comprising:
   a processor; and
   a memory in electronic communication with the processor, wherein instructions stored in the memory are executable to:
   monitor a physical sidelink control channel (PSCCH) for first sidelink control information (SCI) when a first timer is running, and
   for the received first SCI,
   in a case that HARQ feedback is enabled by the first SCI,
      start a second timer upon an end of a physical sidelink feedback channel (PSFCH) transmission for the HARQ feedback,
      start a third timer after an expiry of the second timer, and
      monitor the PSCCH for second SCI when the third timer is running, and
   in a case that the HARQ feedback is disabled by the first SCI,
      start a fourth timer upon an end of a physical sidelink shared channel (PSSCH) transmission indicated in the first SCI,
      start a fifth timer after an expiry of the fourth timer, and
      monitor the PSCCH for the second SCI when the fifth timer is running.

2. A method performed by user equipment, comprising:
   monitoring a physical sidelink control channel (PSCCH) for first sidelink control information (SCI) when a first timer is running, and
   for the received first SCI,
   in a case that HARQ feedback is enabled by the first SCI,
      starting a second timer upon an end of a physical sidelink feedback channel (PSFCH) transmission for the HARQ feedback,
      starting a third timer after an expiry of the second timer, and
      monitoring the PSCCH for second SCI when the third timer is running, and
   in a case that the HARQ feedback is disabled by the first SCI,
      starting a fourth timer upon an end of a physical sidelink shared channel (PSSCH) transmission indicated in the first SCI,
      starting a fifth timer after an expiry of the fourth timer, and
      monitoring the PSCCH for the second SCI when the fifth timer is running.

* * * * *